US011562577B2

(12) United States Patent
Lee

(10) Patent No.: US 11,562,577 B2
(45) Date of Patent: Jan. 24, 2023

(54) METHOD OF DETECTING CURVED LANE THROUGH PATH ESTIMATION USING MONOCULAR VISION CAMERA

(71) Applicant: CARVI INC., Seoul (KR)

(72) Inventor: Eunsu Lee, Seoul (KR)

(73) Assignee: CARVI INC., Seoul (KR)

( * ) Notice: Subject to any disclaimer, the term of this patent is extended or adjusted under 35 U.S.C. 154(b) by 150 days.

(21) Appl. No.: 17/159,150

(22) Filed: Jan. 27, 2021

(65) Prior Publication Data

US 2022/0207276 A1 Jun. 30, 2022

(30) Foreign Application Priority Data

Dec. 18, 2020 (KR) .......................... 10-2020-0178487

(51) Int. Cl.
*G06K 9/00* (2022.01)
*G06V 20/56* (2022.01)

(52) U.S. Cl.
CPC .................................. *G06V 20/588* (2022.01)

(58) Field of Classification Search
CPC .............................. G06V 20/588; G06V 10/44
USPC .......................................................... 382/103
See application file for complete search history.

(56) References Cited

U.S. PATENT DOCUMENTS

| 4,550,383 | A | * | 10/1985 | Sugimoto | ................ B25J 9/161 901/3 |
| 5,247,587 | A | * | 9/1993 | Hasegawa | .............. G06V 10/48 382/104 |
| 7,113,866 | B2 | * | 9/2006 | Taliwal | ................... G01C 21/26 701/410 |
| 7,113,867 | B1 | * | 9/2006 | Stein | ......................... G06T 7/20 |
| 2003/0040864 | A1 | * | 2/2003 | Stein | .................... G06V 20/588 348/148 |
| 2006/0015252 | A1 | * | 1/2006 | Yamamoto | ............ G01S 17/931 701/301 |
| 2010/0104139 | A1 | * | 4/2010 | Kuehnle | .............. G06V 20/588 382/106 |
| 2015/0285614 | A1 | * | 10/2015 | Okada | .................... G01B 11/00 702/155 |
| 2016/0304120 | A1 | * | 10/2016 | Okada | .................... B62D 6/002 |
| 2021/0279484 | A1 | * | 9/2021 | Mori | ............... B60W 30/18163 |

FOREIGN PATENT DOCUMENTS

| KR | 10-1366871 B1 | 2/2014 |
| KR | 10-1455835 B1 | 11/2014 |
| KR | 10-2018-0071552 A | 6/2018 |
| KR | 10-2018-0113294 A | 10/2018 |
| KR | 10-1910256 B1 | 10/2018 |
| KR | 10-2019-0078301 A | 7/2019 |

* cited by examiner

*Primary Examiner* — Gims S Philippe
(74) *Attorney, Agent, or Firm* — Park, Kim & Suh, LLC

(57) ABSTRACT

The present invention provides a method of detecting a curved lane through path estimation using a monocular vision camera by which the curved lane may be estimated by using paths on the curved lane in the past when a lane is not seen on the curved road because of a dotted lane or other causes.

6 Claims, 15 Drawing Sheets

FIG. 7A
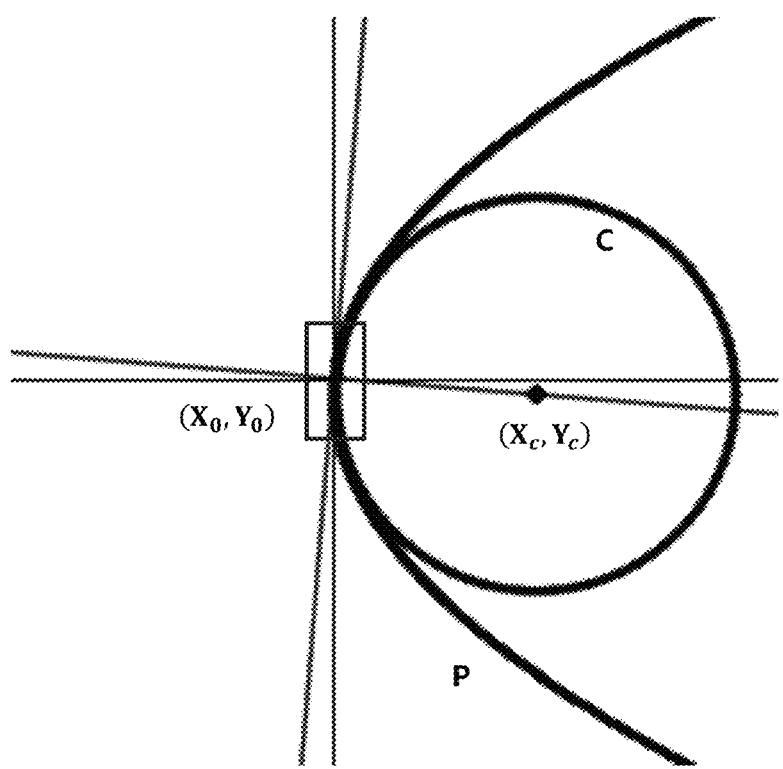

FIG. 7B
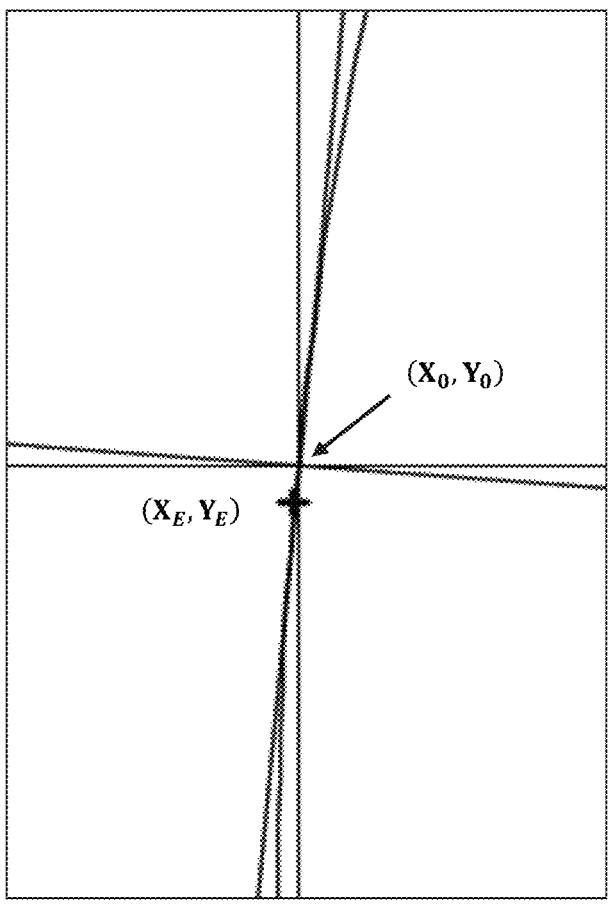

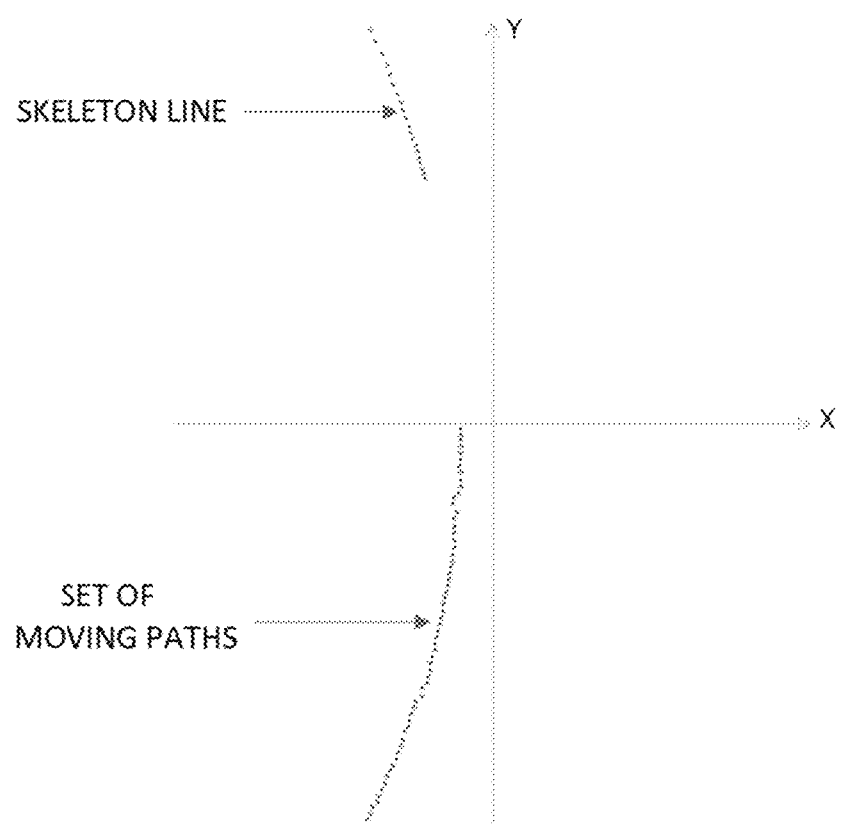

FIG. 11A
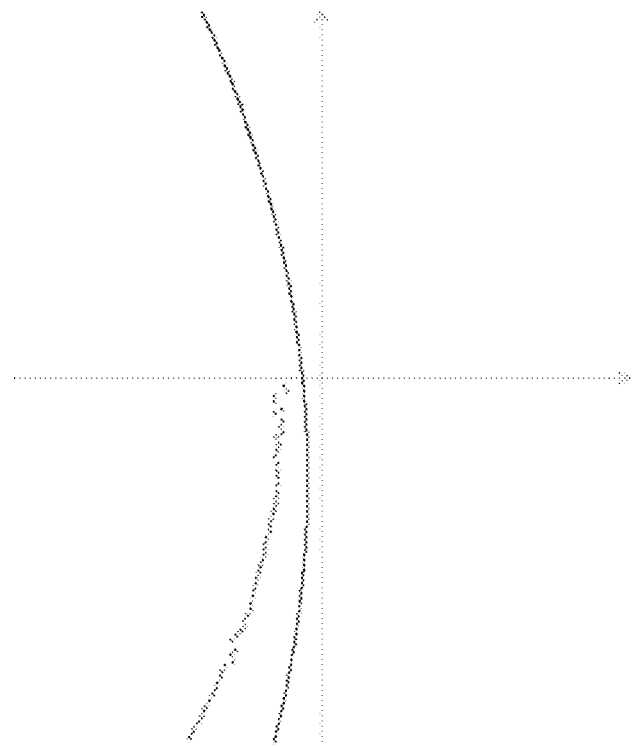
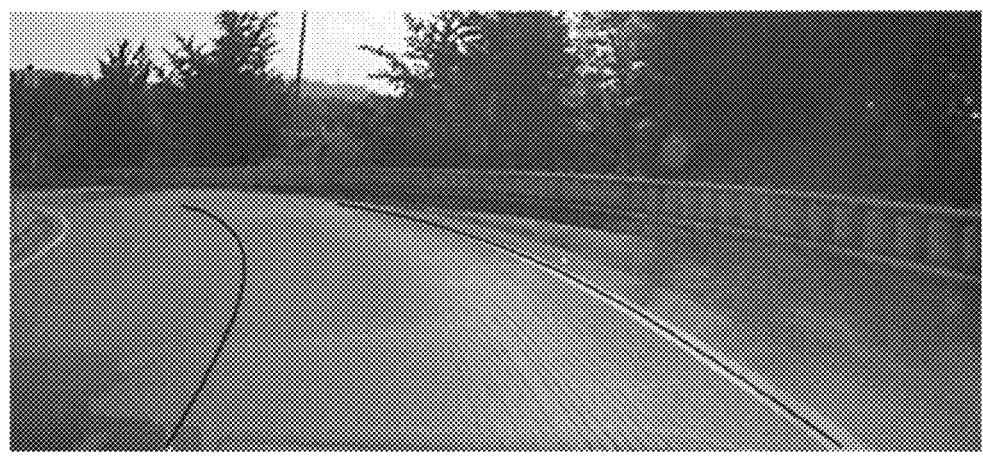

METHOD OF DETECTING CURVED LANE THROUGH PATH ESTIMATION USING MONOCULAR VISION CAMERA

CROSS-REFERENCE TO RELATED PATENT APPLICATION

This application claims the benefit of Korean Patent Application No. 10-2020-0178487, filed on Dec. 18, 2020, in the Korean Intellectual Property Office, the disclosure of which is incorporated herein in its entirety by reference.

BACKGROUND OF THE INVENTION

1. Field of the Invention

The present invention relates to a method of detecting a curved lane through path estimation using a monocular vision camera by which the curved lane may be estimated by using paths on the curved lane in the past when a lane is not seen on the curved road because of a dotted lane or other causes.

2. Description of the Related Art

As widely known, lanes are formed of straight lanes and curved lanes, and a general method of detecting lanes includes detecting lanes in the form of one straight lane so that lane departure is determined.

In Lane Departure Warning System (LDWS), it is important whether vehicle wheels depart from adjacent lanes, instead of seeing lanes at a long distance. Accordingly, there was no problem approximating a closed part of a road as a straight lane in a curved road.

However, in Lane Keeping Assistance System (LKAS) or Forward Collision Warning System (FCWS), lanes at a long distance need to be considered so that whether the lane is curved significantly affects the system.

Accordingly, there is a great increase in requiring of detecting not only a straight lane but also a curved lane. Also, when a gap between dotted lanes is wide on a curved road in a specific frame and thus, an accurate curved lane is hardly found or when dotted lanes are hardly detected due to backlight, performance on detecting of curved lanes needs to be improved.

SUMMARY OF THE INVENTION

The present invention provides a method of detecting a curved lane through path estimation using a monocular vision camera by which the curved lane may be estimated by using paths on the curved lane in the past when a lane is not seen on the curved road because of a dotted lane or other causes.

According to an aspect of the present invention, there is provided a method of detecting a curved lane through path estimation using a monocular vision camera including: acquiring forward images of a curved lane by using a monocular vision camera which captures the front from a vehicle; detecting curved lane candidates from the forward images; detecting a skeleton line having a thickness of 1 pixel by using a median value of the curved lane candidates; estimating a parabolic function which is curve-fitted by using the skeleton line; generating an inscribed circle inscribing in a parabola that corresponds to the parabolic function at a location where a world coordinate value Y is 0; generating a set of moving paths after anticipated coordinates of representative points in a current frame are calculated from coordinates of representative points which are tangent points of the parabola in a previous frame and the inscribed circle on the circumference of the inscribed circle; determining whether the skeleton line satisfies a specific condition for curve fitting in a current frame; and when the skeleton line does not satisfy the specific condition, determining the parabola that fits the skeleton line as a curved lane and when the skeleton line satisfies the specific condition, estimating the parabola which is curve-fitted to all skeleton line and set of the moving paths as a curved lane.

Here, the curved lane candidates may be detected by using a variable top-hat filter, in which a size of a filter window flexibly varies based on a lateral width of lane marking on a road from the forward images.

The skeleton line may be detected by coordinates of a median value selected after scanning in a side direction from the detected curved lane candidates.

The parabolic function that is curved fitted using the skeleton line may be estimated after coefficients of the parabolic function are calculated through a least square method using the coordinates of the skeleton line as input values.

The radius and the center coordinates of the inscribed circle may be calculated by using the radius of curvature at the representative points, which are tangent points of the parabola and the inscribed circle at the world coordinate value Y is 0, and a normal passing through the representative points, and the inscribed circle may be generated after specifying the inscribed circle according to a bent direction of the curved lane.

The anticipated coordinates of the representative points on the circumference may be calculated through a rotation angle according to the circumference of the inscribed circle calculated by using moving distances travelled by vehicle speed, and the set of the moving paths on a current frame may be generated after the set of the moving paths in previous frames is rotated, moved, and converted to coordinate axis on the current frame.

Whether to satisfy the specific condition may be determined by comparative determination between the number of the skeleton line and certain threshold values and comparative determination between absolute values of the coefficients used to determine a bending degree of the parabolic function and certain threshold values.

When the number of the skeleton line is less than the certain threshold values and when the absolute values of the coefficients used to determine a bending degree of the parabolic function exceed the certain threshold values, the parabola which is curve-fitted to all skeleton line and set of the moving paths may be estimated as the curved lane. When the number of the skeleton line is more than the certain threshold values and when the absolute values of the coefficients used to determine a bending degree of the parabolic function are below the certain threshold values, the parabola that fits the skeleton line may be determined as the curved lane.

BRIEF DESCRIPTION OF THE DRAWINGS

The above and other features and advantages of the present invention will become more apparent by describing in detail exemplary embodiments thereof with reference to the attached drawings in which:

FIGS. 7A and 7B illustrate a process of fitting a curved lane to a parabola and a circle and finding a representative point and anticipated coordinates;

FIG. 10 is a world coordinate system where a skeleton line and a set of moving paths are illustrated; and FIGS. 11A and 11B illustrate curved lane estimation and curved lane determination in FIG. 1.

DETAILED DESCRIPTION OF THE INVENTION

Hereinafter, the present invention will be described in more detail with reference to the accompanying drawings to be easily implemented by those of ordinary skill in the art. This invention may be embodied in many alternate forms and should not be construed as limited to only the exemplary embodiments set forth herein.

Figure 1:
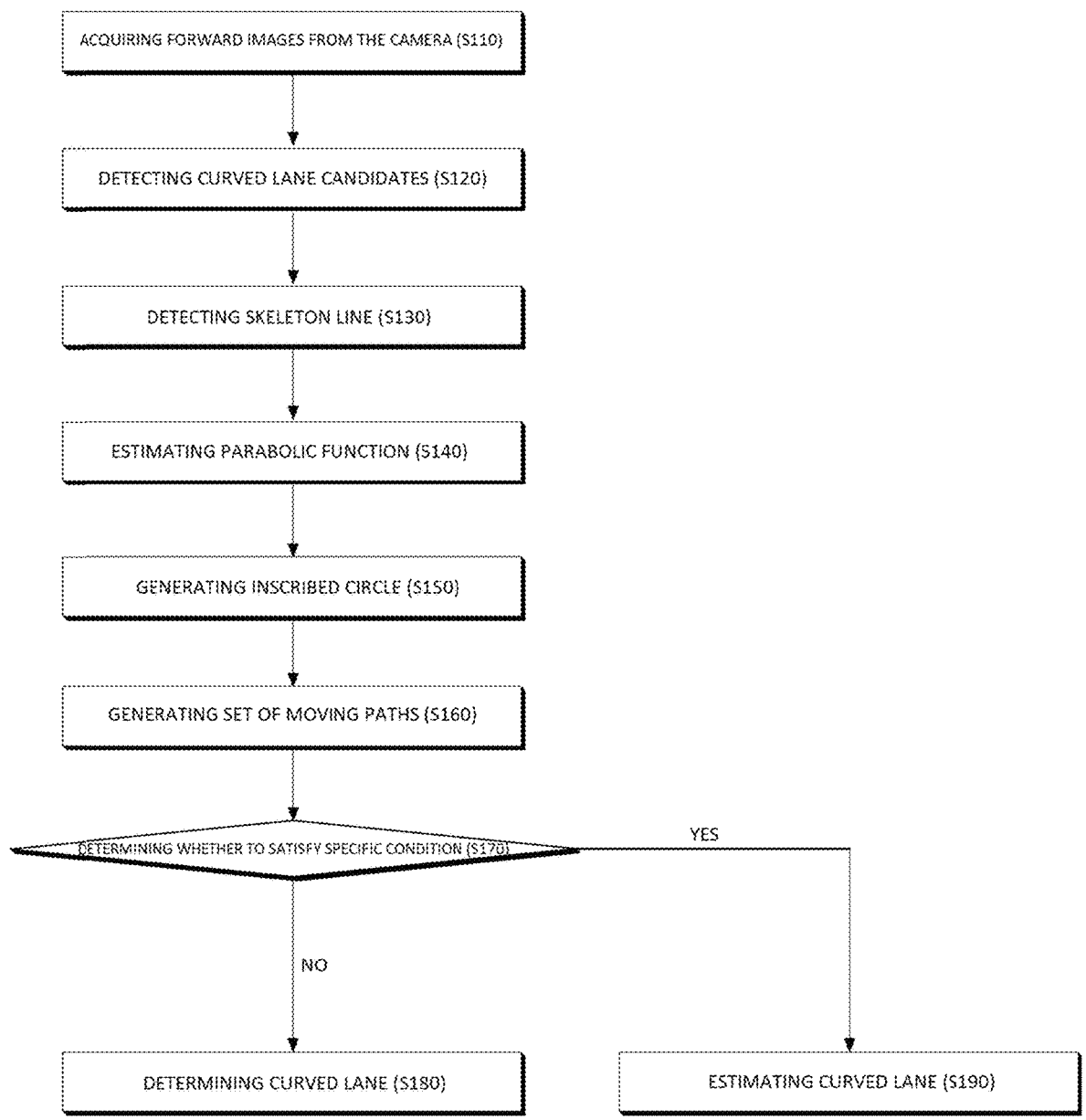
FIG. 1 is a flowchart illustrating a method of detecting a curved lane through path estimation using a monocular vision camera according to an embodiment of the present invention.

Referring to FIG. 1, a method of detecting a curved lane through path estimation using a monocular vision camera according to an embodiment of the present invention includes acquiring forward images of a curved lane by using a monocular vision camera which captures the front from a vehicle, in operation S110, detecting curved lane candidates from the forward images, in operation S120, detecting a skeleton line having a thickness of 1 pixel by using a median value of the curved lane candidates, in operation S130, estimating a parabolic function which is curve-fitted by using the skeleton line, in operation S140, generating an inscribed circle inscribing in a parabola that corresponds to the parabolic function at a location where a world coordinate value Y is 0, in operation S150, generating a set of moving paths after anticipated coordinates of representative points in a current frame are calculated from coordinates of representative points which are tangent points of the parabola in a previous frame and the inscribed circle on the circumference of the inscribed circle, in operation S160, determining whether the skeleton line satisfies a specific condition for curve fitting in a current frame, in operation S170, when the skeleton line does not satisfy the specific condition, determining the parabola that fits the skeleton line as a curved lane, in operation S180, and when the skeleton line satisfies the specific condition, estimating the parabola which is curve-fitted to all skeleton line and set of the moving paths as a curved lane, in operation S190. Accordingly, the curved lane may be estimated by using the moving paths on the curved lane in the past.

Figure 2:
FIG. 2 is a forward image acquired from the camera in FIG. 1.

Firstly, in the acquisition of forward images from vehicles, in operation S110, a monocular vision camera, which captures forward images from the vehicle, is used to acquire the forward images of a curved lane which is bent in the left or in the right on a road, as illustrated in FIG. 2.

Next, in detecting of curved lane candidates, the curved lane candidates are detected from the forward images.

Figure 3A:
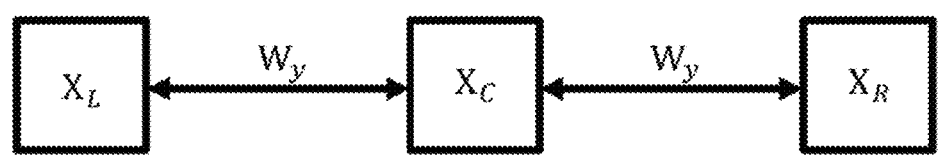
FIGS. 3A and 3B illustrate a structure of a top-hat filter used to detect curved lane candidates and a process of performing filtering after being applied to an input image in FIG. 1.
Figure 4A:
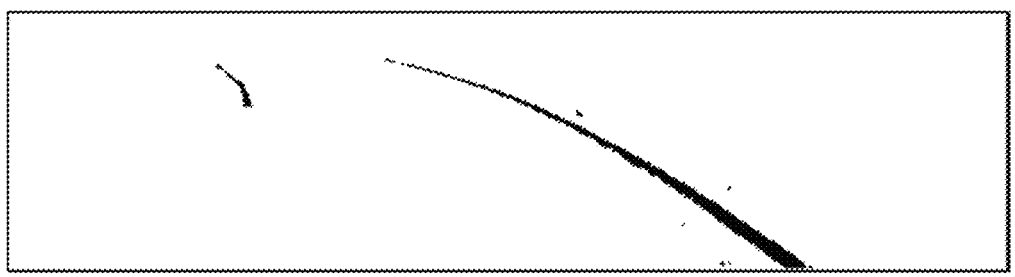
FIGS. 4A and 4B respectively illustrate curved lane candidates and a skeleton line detected in FIG. 1.

As illustrated in FIG. 4A, pixels that correspond to the lane are detected and are stored in a memory. In the method of detecting lane candidates, a variable top-hat filter, in which a size of a filter window flexibly varies based on a lateral width of lane marking on a road, is used. FIG. 3A illustrates a structure of the variable top-hat filter. The filter is one-dimensional and is formed of 3 pixel search boxes. The 3 search boxes are spaced apart from each other and are designed to be spaced by a width of the lane. Here, $X_C$ denotes center coordinates, $X_L$ denotes left coordinates of a filter, and $X_R$ denotes right coordinates of a filter. $W_y$ denotes distances between the search boxes. Equation 1 explains the method of applying the top-hat filter to an image and finding lane candidates.

$$I_{min} = \min(I(X_L), I(X_R)) \qquad \text{[Equation 1]}$$

if($I_{min} > \theta$) $X_C = 1$ otherwise $X_C = 0$

Figure 3B:
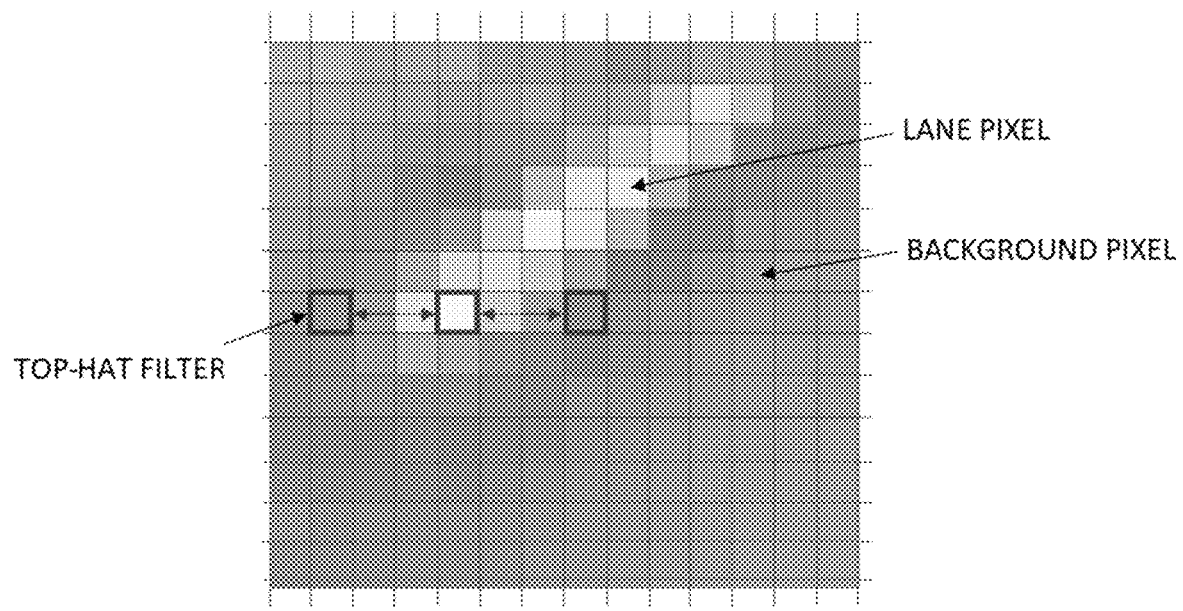

In Equation 1, $I(X_L)$ denotes a brightness value of left coordinates and $I(X_R)$ denotes a brightness value of right coordinate. $I_{min}$ denotes a minimum value from $I(X_L)$ and $I(X_R)$. In Equation 1, when $I_{min}$ is greater than the threshold value, $X_C$, which is the center coordinates of the top-hat filter, is set to 1 and it is indicated that the lane candidates exist. When $I_{min}$ is smaller than the threshold value, $X_C$ is set to 0 and it is indicated that the lane candidates do not exist. In FIG. 3A, $W_y$ is a distance between the search boxes and is set to have a same size with a width of lane marking. $W_y$ is set in the world coordinate system and for example, the width of lane marking may be set to be 15 cm. While converting into the image coordinate system, the width of the lane set in the world coordinate system is set to other value according to an y-axis and for example, values of $W_y$ may be calculated in advance when a program starts. FIG. 3B illustrates a process of performing filtering after the variable top-hat filter is applied to an input image. A latticed square inside denotes 1 pixel. The input image is an enlargement of an actual lane image, wherein a bright part is a lane pixel and a dark part is a background pixel, which is a surface of a road. The top-hat filter is indicated using three squares which are spaced apart from each other by a regular interval. The top-hat filter is processed while moving with respect to the whole area of the image and detects the lane candidates.

Next, in detecting of a skeleton line in operation S130, a median value of the curved lane candidates is used to detect the skeleton line having a thickness of 1 pixel.

Figure 4B:
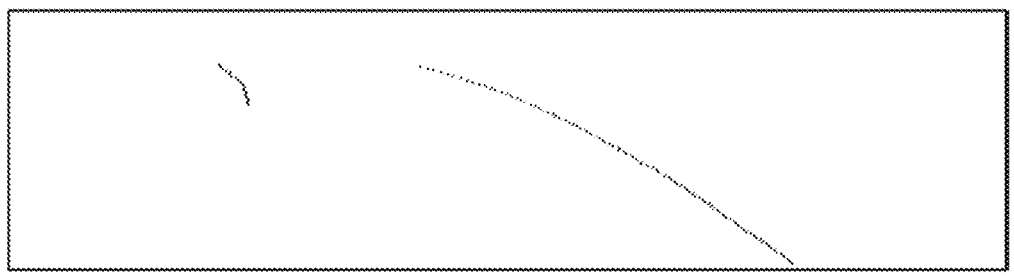

For example, as illustrated in FIG. 4B, the skeleton line including coordinates of the median value selected after scanning in a side direction from the detected curved lane candidates may be detected. Here, the skeleton line denotes a line having a thickness of 1 pixel, which represents the curved lane candidates.

Then, in estimating of a parabolic function in operation S140, a parabolic function that is nearest to the curved lane skeleton line is to be found and the parabolic function that is curved fitted using the skeleton line is estimated.

Since an actual lane on a road is formed of a straight lane and a curved lane, a parabola is used to obtain the best result in curve fitting.

Figure 5A:
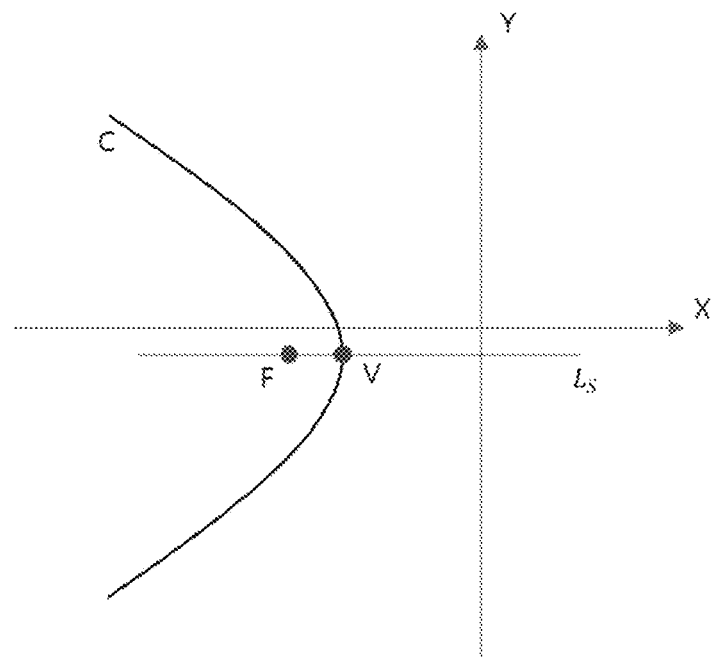
FIGS. 5A and 5B illustrate parabolic function estimation in FIG. 1.

As illustrated in FIG. 5A, a parabola has a circular form near to a vertex V and is changed to a straight line as distance from the vertex increases. Here, in the world coordinate system (X, Y), C is a parabola, V is a vertex of the parabola, and F is a focus of the parabola. $L_s$ is an axis of the parabola passing through F and V and when an actual curved lane is curve-fitted to the parabola, an X-axis of the world coordinate system and the axis $L_s$ of the parabola are not always matched.

The parabola may be expressed in a general quadratic function as in Equation 2.

$$X = c + dY + eY^2, \ e \neq 0 \quad \text{[Equation 2]}$$

Here, X and Y are variables of the world coordinate system and c, d and e are coefficients of the parabola.

In estimating of a parabolic function, coefficients of the parabolic function are calculated through a least square method using the coordinates of the skeleton line as input values and thereby, the parabolic function that is curve-fitted using the skeleton line is estimated.

That is, the skeleton line coordinates of the curved lane are input and coefficients of [Equation 2] may be obtained by using a least square method with respect to the parabola.

Figure 11B:
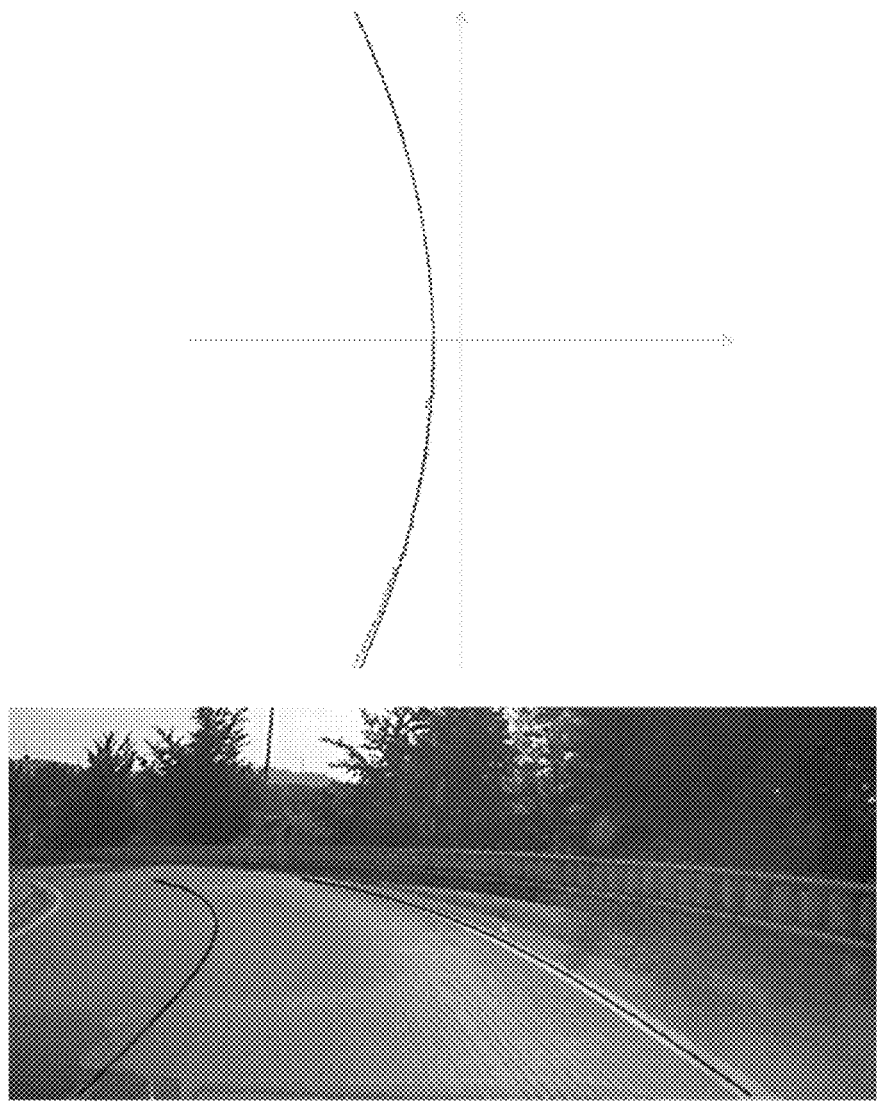

An actual example of the parabola that is fitted to the skeleton line of a curved lane is illustrated in FIG. 11A. When a curved lane is a dotted lane, an accurate curved lane may not be found due to a lack of information obtained from a current frame and thus, information on moving paths needs to be used.

A method of finding moving paths of the curved lane described above includes generating of an inscribed circle in operation S150 and generating a set of the moving paths in operation S160.

The generating of an inscribed circle in operation S150 is a first step for obtaining moving paths, wherein an inscribed circle inscribed to a parabola corresponding to a parabolic function is generated at where a world coordinate value Y is 0.

Figure 5B:
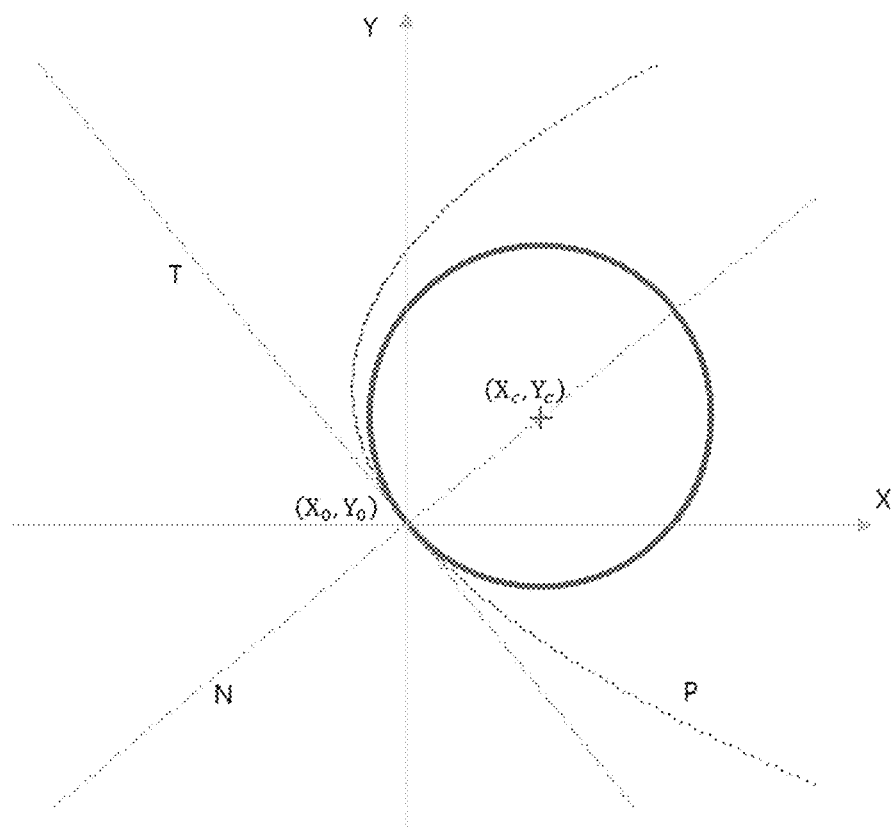

FIG. 5B illustrates a parabola fitted to a curved lane and tangent points $(X_0, Y_0)$ are representative points representing lane paths. Also, In FIG. 5B, a tangent T, a normal N, and an inscribed circle inscribed to the tangent points of the tangent T and the normal N are illustrated. The tangent points are at Y=0 in the parabola of [Equation 2] and thereby, are expressed as in [Equation 3].

$$(X_0, Y_0) = (c, 0) \quad \text{[Equation 3]}$$

Here, in the world coordinate system representing by X and Y, the center coordinates of a circle is $(X_c, Y_c)$, P is a parabola, T is a tangent, and N is a normal.

Also, a radius of curvature of a current frame in the parabola, that is, the radius of the circle, is obtained from the point $(X_0, Y_0)$ where the parabola meets the x-axis. In a method of obtaining a curvature, a formula of obtaining a curvature by using differentiation of tangential angle is used and a general function y=f(x) is expressed as in [Equation 4].

$$k = \frac{|y''|}{\{1+(y')^2\}^{\frac{3}{2}}} \quad \text{[Equation 4]}$$

The parabola [Equation 2] is input to the [Equation 4] and calculation is performed, the curvature is obtained as in [Equation 5].

$$k(y) = \frac{|2e|}{\{1+(d+2ey)^2\}^{\frac{3}{2}}} \quad \text{[Equation 5]}$$

The radius of curvature is an inverse number of the curvature and thus, is expressed as in [Equation 6].

$$r(y) = \frac{\{1+(d+2ey)^2\}^{\frac{3}{2}}}{|2e|} \quad \text{[Equation 6]}$$

Accordingly, the radius of the inscribed circle contacting an arbitrary point of the curve may be obtained.

A method of obtaining the center coordinates of the inscribed circle is as follows.

When the function of the curve is y=f(x), a general equation of the tangent contacting the point $x_0$ on the curve using differentiation is as in [Equation 7].

$$y = f'(x_0)(x - x_0) + f(x_0) \quad \text{[Equation 7]}$$

The method used in coordinates of [Equation 2] of the parabola is applied to [Equation 7] and [Equation 8] is shown.

$$X = f'(Y_0)(Y - Y_0) + f(Y_0) \quad \text{[Equation 8]}$$

$$f(Y) = c + dY + eY^2 \quad \text{[Equation 9]}$$

$$f'(Y) = d + 2eY \quad \text{[Equation 10]}$$

Here, [Equation 9] and [Equation 10] are input to [Equation 8], an equation of a tangent as in [Equation 11] below may be obtained.

$$X = (d + 2eY_0)Y + c - eY_0^2 \quad \text{[Equation 11]}$$

The position of the tangent to be obtained is at $Y_0=0$ and thus, [Equation 11] of the tangent is simplified as in [Equation 12].

$$X = dY + c \quad \text{[Equation 12]}$$

An equation of a normal of the tangent in [Equation 12] is as in [Equation 13].

$$X = -\frac{1}{d}Y + c \quad \text{[Equation 13]}$$

When Y of the parabola described above is 0, the tangent and the normal are illustrated in FIG. 5B. $(X_0, Y_0)$ are tangent points where the parabola meets the tangent. When $Y_0=0$, $X_0=c$ according to [Equation 12].

Also, the center coordinates $(X_c, Y_c)$ of the inscribed circle of the parabola are obtained as described above.

The center coordinates exist on the normal of [Equation 13], the radius of the inscribed circle is obtained by [Equation 6], the distance between the tangent points $(X_0, Y_0)$ and the center coordinates $(X_c, Y_c)$ of the inscribed circle is the radius r of the inscribed circle and thus, [Equation 14] may be expressed.

$$(X_c - X_0)^2 + (Y_c - Y_0)^2 = r^2 \quad \text{[Equation 14]}$$

[Equation 13] of the normal passes the center coordinates $(X_c, Y_c)$ of the inscribed circle and thus, [Equation 15] may be expressed.

$$X_c = -\frac{1}{d}Y_c + c \qquad \text{[Equation 15]}$$

When [Equation 15] is input to [Equation 14], a quadratic equation with respect to $Y_c$ is expressed as follows.

$$\left(\frac{1}{d^2}+1\right)Y_c^2 + \left(\frac{2(X_0-c)}{d}-2Y_0\right)Y_c + (c-X_0)^2 + Y_0^2 - r^2 = 0 \qquad \text{[Equation 16]}$$

$(x_0,Y_0)=(c,0)$. When $(X_0,Y_0)=(c,0)$ is input to [Equation 16], it is simplified as in [Equation 17].

$$\left(\frac{1}{d^2}+1\right)Y_c^2 - r^2 = 0 \qquad \text{[Equation 17]}$$

In [Equation 17], $Y_c$ may be obtained and is expressed as in [Equation 18]. When $Y_c$ is input to [Equation 15]), $X_c$ may be obtained as in [Equation 19].

$$Y_c = \pm\sqrt{\frac{r^2 d^2}{1+d^2}} \qquad \text{[Equation 18]}$$

$$X_c = c - \frac{1}{d}\sqrt{\frac{r^2 d^2}{1+d^2}} \qquad \text{[Equation 19]}$$

As such, the radius and the center coordinates of the inscribed circle may be calculated by using the radius of curvature at the representative points, which are tangent points of the parabola and the inscribed circle at the world coordinate value Y is 0, and the normal passing through the representative points.

The inscribed circle needs to be generated after specifying the inscribed circle according to a bent direction of the curved lane. [Equation 18] has two values including a positive number and a negative number and thus, the inscribed circle is determined by [Equation 20] according to a bent direction of the parabola.

$$Y_c = \sqrt{\frac{r^2 d^2}{1+d^2}} \quad \text{if } ((e \times d) < 0) \qquad \text{[Equation 20]}$$

$$Y_c = -\sqrt{\frac{r^2 d^2}{1+d^2}} \quad \text{if } ((e \times d) > 0)$$

Figure 6A:
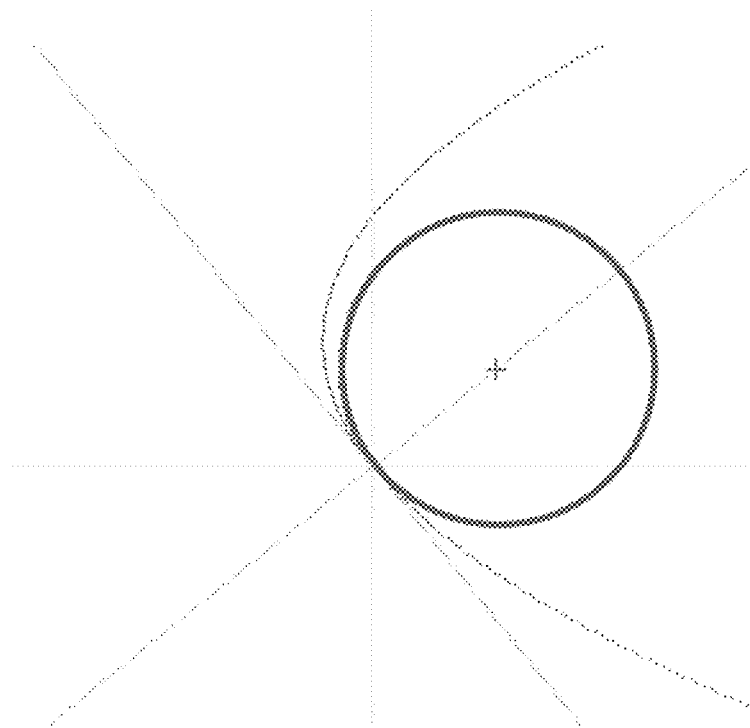
FIGS. 6A and 6B illustrate generation of inscribed circles in FIG. 1.
Figure 6B:
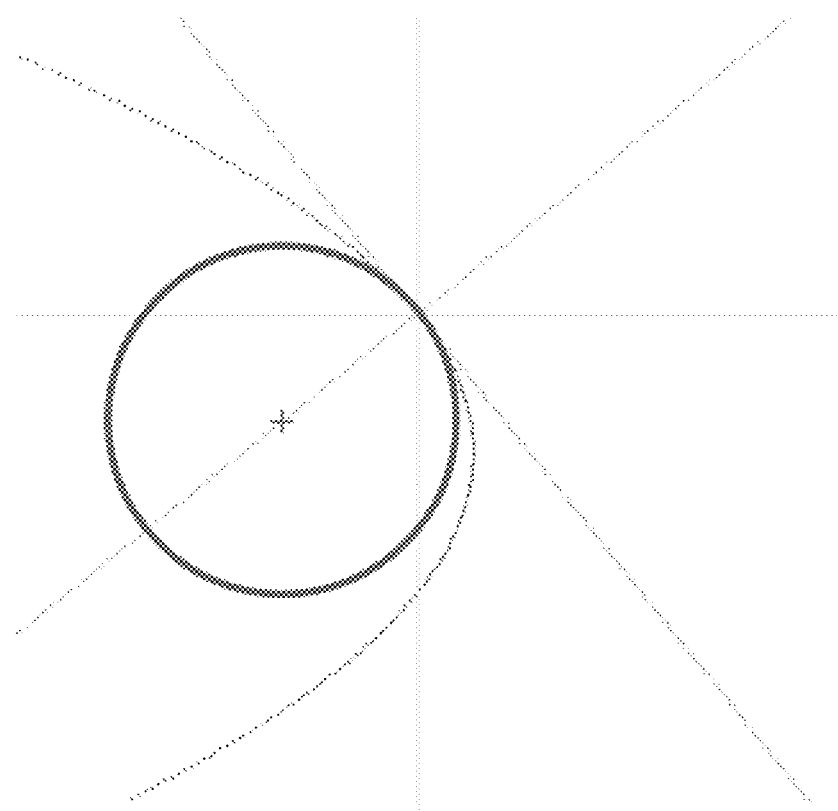

That is, when the multiplication of the coefficients of the parabola (e×d) in [Equation 20] is a negative number, $Y_c$ is a positive number. When the multiplication of the coefficients of the parabola (e×d) is a positive number, $Y_c$ is a negative number. Based on [Equation 20], when (e×d) is a positive number, it is expressed as in FIG. 6B and when (e×d) is a negative number, it is expressed as in FIG. 6A.

As such, the radius and the center coordinates of the inscribed circle may be obtained, wherein the inscribed circle passes through the coordinates where Y=0 in the parabola fitted to an initial curved lane.

Next, in generating a set of the moving paths in operation S160, anticipated coordinates of the representative points in a current frame are calculated from the coordinates of the representative points, which are the tangent points of the parabola and the inscribed circle in a previous frame on the circumference of the inscribed circle, and the set of the moving paths is generated.

That is, the anticipated coordinates of the representative points on the circumference are calculated through a rotation angle according to the circumference of the inscribed circle calculated by using moving distances with travelled by vehicle speed. Then, the set of the moving paths in previous frames is rotated, moved, and converted to coordinate axis on the current frame and the set of the moving paths on the current frame is generated.

More specifically, a method of predicting where the representative points of the current frame are to be located in a next frame, by using a circle fitted to a current curved lane and information about speed of a subject vehicle is described below.

The representative points are coordinates which may represent moving paths on a curved lane. In FIG. 7B, $(X_0,Y_0)$ denotes coordinates of the representative points in a current frame and $(X_E,Y_E)$ denotes anticipated coordinates in a next frame.

For reference, for efficient programming, values illustrated below, where units are omitted, are values obtained by multiplying actual data by 0.1. For example, 1 m is 0.1 and FIG. 7A illustrates the parabola which recognizes a left lane on an actual curved road.

The speed of a vehicle is 37 km/h, the radius of curvature is 64.527 m, and a coefficient of the curve-fitted parabola is as in [Equation 21].

$$c=-0.2410, \ d=0.0840, \ e=0.0783 \qquad \text{[Equation 21]}$$

In the representative points coordinates $(X_0,Y_0)$ of the parabola in a current frame, Y is 0 and thus, $(X_0,Y_0)$ are as in [Equation 22] by the coefficient of [Equation 21] of the parabola.

$$(X_0,Y_0)=(-0.2410,0) \qquad \text{[Equation 22]}$$

[Equation 22] is input to [Equation 19] and [Equation 20] and thereby, the center coordinates of the inscribed circle may be obtained as in [Equation 23].

$$X_c=6.189, \ Y_c=-0.5401 \qquad \text{[Equation 23]}$$

Since the vehicle speed is measured based on rotation of wheels, moving distances according to time moves along a circle of FIG. 7A. That is, after 1 frame, when a point moves to other point along an arc on the circumference of the circle, the moving distance moves by 0.3426 m and a movement angle may be obtained from a distance of the arc moved from the inscribed circle.

For example, an arc length $L_c$ of a circle is expressed as in [Equation 24].

$$L_c = \frac{\pi r \theta}{180} \qquad \text{[Equation 24]}$$

[Equation 24] is set in terms of an angle as in [Equation 25].

$$\theta = \frac{180 \times L_c}{\pi r} \qquad \text{[Equation 25]}$$

In above Equation, $L_c$=0.3426 m/f and r=64.527 m and thereby, a movement angle is as in [Equation 26].

$$\Delta\theta = \frac{180 \times 0.3426}{\pi \times 64.527} = 0.3042 \qquad [\text{Equation 26}]$$

Consequentially, a present vehicle in FIG. 7A moves by an angle of 0.3 degree per 1 frame and a moving distance thereof is 0.3426 m.

In this regard, a process of obtaining anticipated coordinates in a frame next to the coordinates of the representative points in the current frame on the inscribed circle is as follows.

The relationship between an angle of a circle and coordinates uses a parametric form of a circle using a trigonometrical function, and coordinates on the circumference are obtained by [Equation 27].

$$X = X_c + r \cos\theta$$

$$Y = Y_c + r \sin\theta \qquad [\text{Equation 27}]$$

Also, an angle of arbitrary coordinates on the circumference is obtained by $$0 = \cos^{-1}\left(\frac{X - X_c}{r}\right) \qquad [\text{Equation 28}]$$

$$0 = \sin^{-1}\left(\frac{Y - Y_c}{r}\right).$$

An angle in the inscribed circle of the coordinates of the representative points ([Equation 22]) in the parabola of the current frame is obtained as in [Equation 29].

$$0 = \cos^{-1}\left(\frac{-0.2410 - 6.189}{6.4527}\right) - 175.1926 \qquad [\text{Equation 29}]$$

$$0 = \sin^{-1}\left(\frac{0 - -0.5401}{6.4527}\right) = 4.8014$$

After 1 frame is passed in [Equation 26], the movement angle $\Delta\theta$ is 0.3042 degrees and thus, an anticipated angle in a next frame is obtained in [Equation 30].

$$\theta_2 = \theta + \Delta\theta = 175.1926 + 0.3042 = 175.4968 \qquad [\text{Equation 30}]$$

In the inscribed circle C of FIG. 7A, the anticipated coordinates $(X_E, Y_E)$ of the next frame may be obtained as in [Equation 31] by inputting $\theta_2$ to [Equation 27].

$$X_E = 6.189 + 6.4527 \cos\theta_2 = -0.2438$$

$$Y_E = -0.5401 + 6.4527 \sin\theta = -0.03347 \qquad [\text{Equation 31}]$$

FIG. 7B illustrates an enlargement of a quadrangle in FIG. 7A. A cross in FIG. 7B indicates coordinates obtained in [Equation 31] and is anticipated coordinates $(X_E, Y_E)$ in a next frame of the representative points.

As such, where the representative points of the current frame are to be located in a next frame may be obtained.

A method of calculating a moving path vector when one more frame is further moved with respect to a time axis is as follows.

Figure 8:
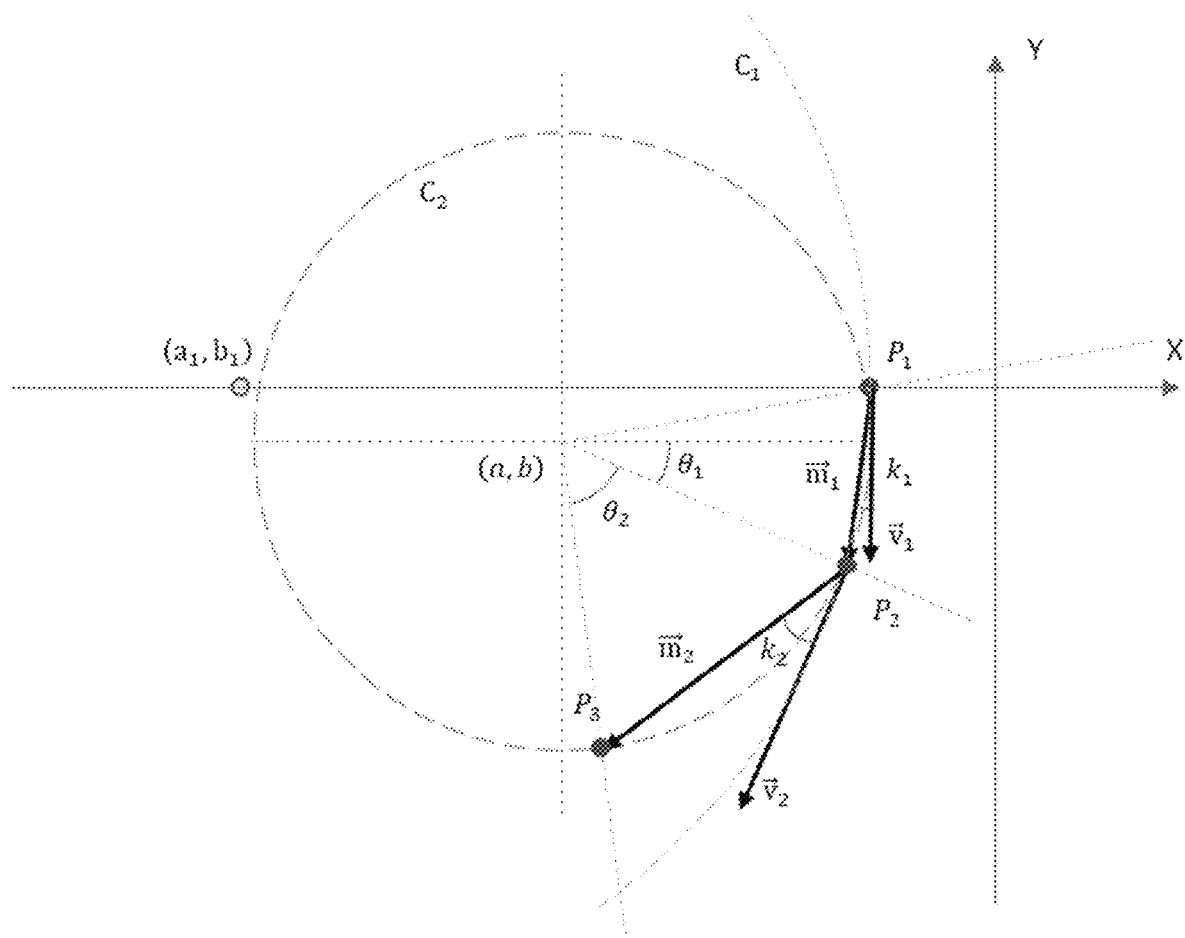
FIG. 8 illustrates moving paths of latest two representative points when driving a curved road.

A vector is used to represent a moving path of lane coordinates with respect to time and space and FIG. 8 illustrates geometric location of the representative points obtained from two frames.

For example, FIG. 8 illustrates moving paths of the representative points which may be obtained from two frames when driving a curved road in a general situation.

Here, $C_1$ denotes an inscribed circle of a current frame and $C_2$ denotes an inscribed circle of a previous frame.

The vector $m_1$ of a current frame is not same with the vector $m_2$ of a previous vector. That is, the curvatures thereof are different from each other ($k_1 \neq k_2$) and speed thereof is also different from each other ($v_1 \neq v_2$). The representative point $P_2$ of the previous frame is at the same location as $(X_E, Y_E)$ obtained in [Equation 31] and $P_3$ is an anticipated coordinate with respect to $P_2$.

Through processes below, the center coordinates (a,b) of the inscribed circle $P_2$ in the previous frame and the rotation angle $\theta^1$ with respect to the center coordinates are to be obtained.

An equation of a circle using the radius of the circle $C_2$ of the previous frame, wherein the circle passes through the representative point $P_2$ of the previous frame and the representative point $P_1$ of the current frame, is obtained to obtain the center (a,b) of the circle. The center coordinates (a,b) of the circle $C_2$ which passes through the two points $P_1(x_1, y_1)$ and $P_2(x_2, y_2)$ and has the radius r is obtained as follows.

$$(x-a)^2 + (y-b)^2 = r^2 \qquad [\text{Equation 32}]$$

$$(x_1 - a)^2 + (y_1 - b)^2 = r^2 \qquad [\text{Equation 33}]$$

$$(x_2 - a)^2 + (y_2 - b)^2 = r^2 \qquad [\text{Equation 33}]$$

r is an invariable number which is same in [Equation 33] and [Equation 34] above and thus, is as in [Equation 35].

$$(x_1 - a)^2 + (y_1 - b)^2 = (x_2 - a)^2 + (y_2 - b)^2 \qquad [\text{Equation 35}]$$

$$a^2 - 2x_1 a + x_1^2 + b^2 - 2y_1 b + y_1^2 = a^2 - 2x_2 a + x_2^2 + b^2 - 2y_2 b + y_2^2 \qquad [\text{Equation 36}]$$

[Equation 36] is set in terms of b as in [Equation 37].

$$b = \frac{2(x_2 - x_1)a - x_2^2 - y_2^2 + x_1^2 + y_1^2}{2(y_1 - y_2)} \qquad [\text{Equation 37}]$$

[Equation 37] is set in terms of a variable number a and an invariable number as in [Equation 38].

$$b = \frac{x_2 - x_1}{y_1 - y_2} a + \frac{x_1^2 - x_2^2 + y_1^2 - y_2^2}{2(y_1 - y_2)} = Ka + L \qquad [\text{Equation 38}]$$

Here, in order to simplify calculation, K and L are considered as invariable number values.

In order to obtain the variable number a, [Equation 33] is set as in [Equation 39].

$$a^2 - 2x_1 a + x_1^2 + b^2 - 2y_1 b + y_1^2 - r^2 = 0 \qquad [\text{Equation 39}]$$

When [Equation 38] is input to [Equation 39], [Equation 40] is obtained.

$$a^2 - 2x_1 a + x_1^2 + (Ka+L)^2 - 2y_1(Ka+L) + y_1^2 - r^1 = 0 \qquad [\text{Equation 40}]$$

[Equation 40] is set by a quadratic equation with respect to a as in [Equation 41].

$$(1+K^2)a^2 + 2(KL - x_1 - y_1 K)a + L^2 - 2y_1 L + x_1^2 + y_1^2 - r^2 = 0 \qquad [\text{Equation 41}]$$

[Equation 41] is a quadratic equation with respect to a. When a quadratic formula of [Equation 42] is applied, a may be obtained.

$$Aa^2 + Ba + C = 0 (A \neq 0) \qquad \text{[Equation 42]}$$

$$a = \frac{-B \pm \sqrt{B^2 - 4AC}}{2A}$$

When a obtained in [Equation 42] is input to [Equation 38], may be obtained. According to the above processes, the center coordinates (a,b) of the circle $C_2$ in FIG. 8 may be obtained.

$\theta_1$ is an unknown member. When the center coordinates (a,b), the radius r, and the coordinates $x_2, y_2$ of $P_2$ are input to the parameter of the circle [Equation 28], $\theta_1$ may be obtained as in [Equation 43].

$$\theta_1 = \cos^{-1}\left(\frac{x_2 - a}{r}\right) = \sin^{-1}\left(\frac{y_2 - b}{r}\right) \qquad \text{[Equation 43]}$$

As above, geometric information of the current frame and the previous frame is used to obtain the center coordinates (a,b) of the inscribed circle of the representative point $P_2$ in the previous frame and the rotation angle $\theta_1$ with respect to the center coordinates.

As the last process in generating of the set of the moving paths in operation S160, generating of a set of the entire moving paths is described as follows. That is, as time passes, coordinate conversion in a set of the accumulated moving path representative points is to be described.

Figure 9A:
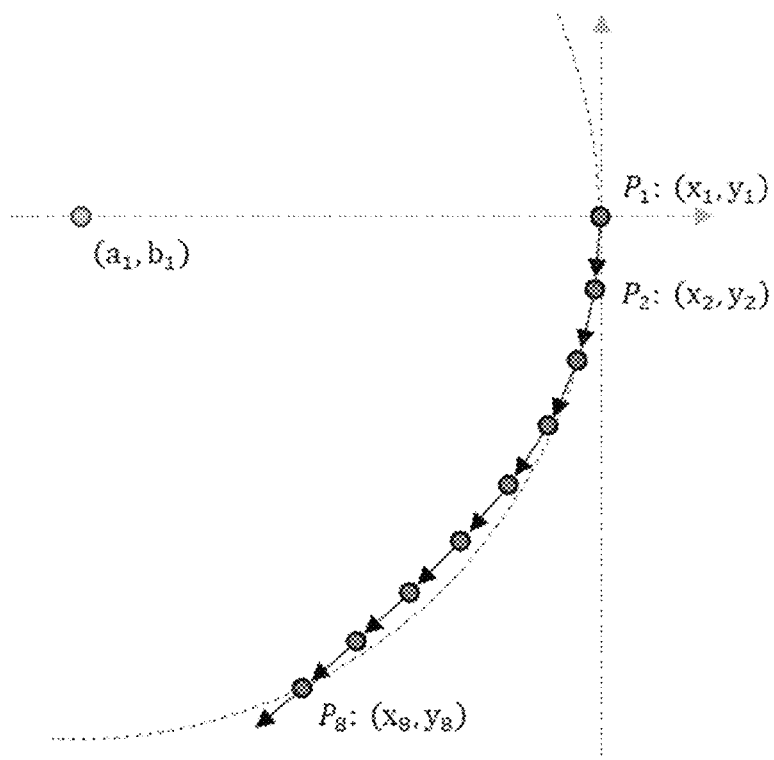
FIGS. 9A and 9B illustrate the coordinate conversion in a set of accumulated moving path representative points.
Figure 9B:
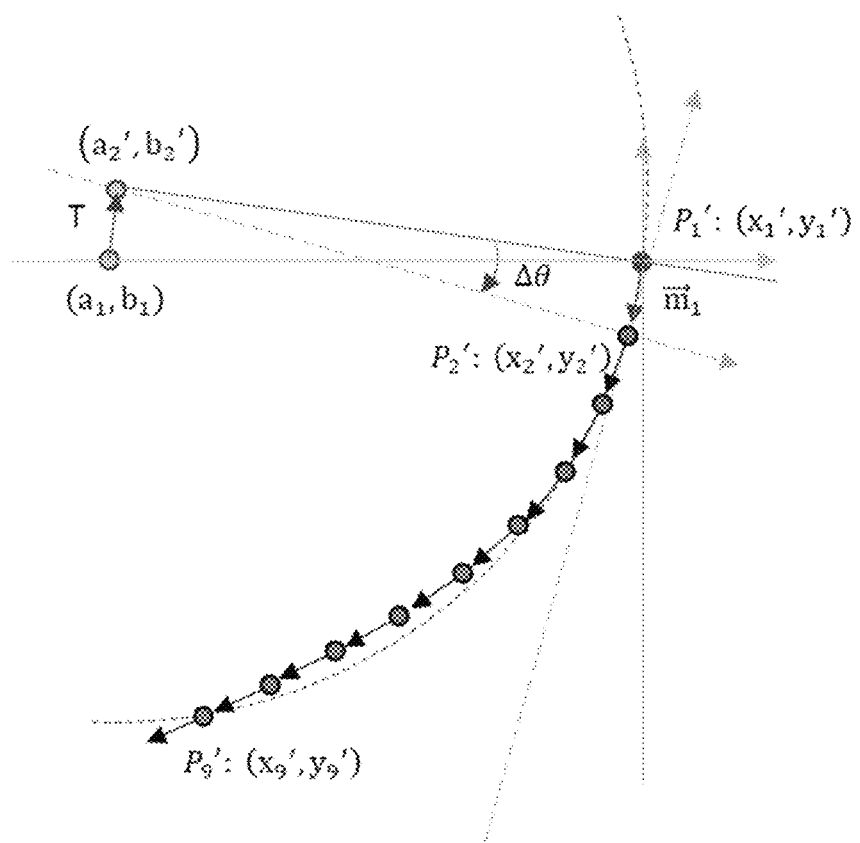

Each point in FIGS. 9A and 9B denotes representative points in an arbitrary frame and arrows denote vectors toward the next representative points. FIG. 9A illustrates the set of the representative points in kth frame, wherein dotted arrows are coordinate axes with the representative point $P_1$ at the center, the point $(a_1, b_1)$ is the center coordinate of the inscribed circle fitted to the points adjacent to the current representative point $P_1$, and the points from the representative point $P_2$ to $P_0$ are representative points in the past and are moving paths of the curved lane each of which maintains distances and angles.

Also, FIG. 9B illustrates movement of the set of the representative points in FIG. 9A in a (k+1)th frame. The set of the moving paths $\{P_1, P_2, \ldots, P_0\}$ of FIG. 9A is moved to the set of the moving paths $\{P_2', P_3', \ldots, P_9'\}$ in FIG. 9B and the center coordinate is moved from $(a_1, b_1)$ to $(a_2', b_2')$.

The set of the representative points in the previous frame is rotated, moved, and converted to coordinate axis on the current frame. As illustrated in FIG. 9B, the coordinate axis (dotted arrows) of FIG. 9A is rotated, moved, and converted with respect to the coordinate axis (horizontal and vertical solid arrows) of FIGS. 9A and 9B.

The arrow $m_1$ in FIG. 9B is a motion vector newly detected in the (k+1)th frame, 8 arrows in FIGS. 9A and 9B are the set of the representative points in the kth frame, and $P_1'$ is included in the set $V_k^T$ of the representative points generated after $V_k$ is rotated and moved in FIG. 9B. Accordingly, a new set $V_{k+1}$ of the representative points is generated and is expressed as in [Equation 44].

$$V_k^T = AV_k \qquad \text{[Equation 44]}$$

$$V_{k+1} = \{(x_i, y_i) | 1 \leq i \leq n, V_k^T \ni P_1'\} \qquad \text{[Equation 45]}$$

Here, A denotes rotation, movement, and conversion matrix.

8 arrows connected to $m_1$ are moved by T from the coordinates of FIG. 9A and are the result obtained after rotation and conversion by an angle of $\Delta\theta$ are performed centering around $(a_2', b_2')$.

In FIG. 9B, it is important that the set $V_k^T$ of the representative points $(P_2', \ldots, P_9')$ is simultaneously rotated and moved. Consequentially, it means that as time passes, the set $V_{k+1}$ of the representative points in the current frame includes changed moving paths of the set of the representative points in the previous frame.

[Equation 44] may be expressed more specifically as in [Equation 46].

$$x_{i+1}' = (x_i - a_2')\cos(\Delta\theta) - (y_i - b_2')\sin(\Delta\theta) + a_2'$$

$$y_{i+1}' = (x_i - a_2')\sin(\Delta\theta) + (y_i - b_2')\cos(\Delta\theta) + b_2' \qquad \text{[Equation 46]}$$

Here, $(x_i, y_i)$ denotes the coordinates of the representative points in the previous frame, $(x_{i+1}', y_{i+1}')$ denotes the coordinates of the representative points where the current rotation, movement, and conversion are applied, and $(a_2', b_2')$ denotes the center coordinates of the inscribed circle of the representative point $P_2'$ and is same as the center coordinates (a,b) of the circle $C_2$ already obtained in FIG. 8.

Also, in FIG. 9B, the angle $\Delta\theta$ denotes an angle between $P_1'$ and $P_2'$ and may be obtained by using [Equation 26]. Consequentially, when [Equation 46] is used, converted coordinates of the set $V_k^T$ of the representative points may be all obtained in FIG. 9B. In other words, such processes are performed with respect to sequential frames and moving paths of the curved lane may be obtained through accumulated processes. For example, when the image of FIG. 1 is a current frame, the set of the moving paths may be represented by points where a Y value is a negative number in FIG. 10.

Next, in determining whether to satisfy a specific condition, in operation S170, whether the skeleton line in the current frame satisfies a specific condition for curve fitting is determined.

That is, whether to satisfy the specific condition is determined by comparative determination between the number of the skeleton line and certain threshold values and comparative determination between absolute values of the coefficients used to determine a bending degree of the parabolic function and certain threshold values.

More specifically, when information about the skeleton line of the current frame is enough, a curved lane may be obtained only by the skeleton line, in operation S180. When information about the skeleton line is not enough, the process is branched off to estimating the curved lane by using the moving paths, in operation S190.

[Equation 47] provides a conditional sentence with respect to a specific condition.

$$\text{if}((N_s < \theta_1) \wedge (|e| > \theta_2)) \text{ goto } S190 \qquad \text{[Equation 47]}$$

otherwise goto S180

Here, $N_s$ is the number of the skeleton line and $\theta_1$ is a threshold value of the number of the skeleton line.

When the number of the skeleton line is smaller than the threshold value ($N_s < \theta_1$), the process needs to be branched off to estimating the curved lane in operation S190.

$|e|$ denotes the absolute value of the coefficients in [Equation 2] and a bending degree of a parabola. ($|e| > \theta_2$) denotes that bending of the parabola, which fits the skeleton line of the current frame, is greater than the threshold value $\theta_2$ and that a greatly bent curve only satisfies the condition.

Next, when the skeleton line does not satisfy the specific condition, the parabola that fits the skeleton line is determined as a curved lane in operation S180. When the skeleton line satisfies the specific condition, the parabola which is curve-fitted to all skeleton line and set of the moving paths is estimated as a curved lane in operation S190.

That is, when the number of the skeleton line is less than the certain threshold values and when the absolute values of the coefficients used to determine a bending degree of the parabolic function exceed the certain threshold values, the parabola which is curve-fitted to all skeleton line and set of the moving paths is estimated as the curved lane. When the number of the skeleton line is more than the certain threshold values and when the absolute values of the coefficients, which determine a bending degree of a parabolic function, are below the certain threshold values, the parabola that fits the skeleton line is determined as the curved lane.

More specifically, estimating of a curved lane in operation S190 is described below.

The parabola is obtained by using a least square method, wherein the latest coordinates of the set of the moving paths and the coordinates of the skeleton line are used as input values. For example, the skeleton lines obtained from the left dotted lane in FIG. 4B are illustrated in the world coordinate system and are same as the skeleton line in FIG. 10.

Here, FIG. 10 is the world coordinate system, where the coordinates of the skeleton line and the set of moving paths are illustrated. When the coordinates in FIG. 10 are all fitted to a parabola, a curve at the top of FIG. 11B may be illustrated. When the curve is converted into an image coordinate system, a left curve at the bottom of FIG. 11B may be illustrated.

When the parabola is found using the skeleton line only without using the set of the moving paths, a curve at the top of FIG. 11A is illustrated. When the curve is converted into an image coordinate system, a left curve at the bottom of FIG. 11A may be illustrated.

Consequentially, in case of a dotted curved lane, when the condition of [Equation 47] is satisfied, more accurate curved lane may be estimated by using the set of the moving paths.

According to the method of detecting a curved lane through path estimation using a monocular vision camera described above, even if an accurate curve is hardly found due to existence of a lane at a great distance in a specific frame or a dotted lane is hardly detected due to backlight, the curved lane may be estimated by using the moving paths in the past.

According to the present invention, even if an accurate curve is hardly found due to existence of a lane at a great distance in a specific frame or a dotted lane is hardly detected due to backlight, the curved lane may be estimated by using the moving paths in the past.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a curved lane through path estimation using a monocular vision camera comprising:
   acquiring forward images of a curved lane by using a monocular vision camera which captures the front from a vehicle;
   detecting curved lane candidates from the forward images;
   detecting a skeleton line having a thickness of 1 pixel by using a median value of the curved lane candidates;
   estimating a parabolic function which is curve-fitted by using the skeleton line;
   generating an inscribed circle inscribing in a parabola that corresponds to the parabolic function at a location where a world coordinate value Y is 0;
   generating a set of moving paths after anticipated coordinates of representative points in a current frame are calculated from coordinates of representative points which are tangent points of the parabola in a previous frame and the inscribed circle on the circumference of the inscribed circle;
   determining whether the skeleton line satisfies a specific condition for curve fitting in a current frame; and
   when the skeleton line does not satisfy the specific condition, determining the parabola that fits the skeleton line as a curved lane and when the skeleton line satisfies the specific condition, estimating the parabola which is curve-fitted to all skeleton line and set of the moving paths as a curved lane,
   wherein whether to satisfy the specific condition is determined by comparative determination between the number of the skeleton line and certain threshold values and comparative determination between absolute values of the coefficients used to determine a bending degree of the parabolic function and certain threshold values,
   wherein when the number of the skeleton line is less than the certain threshold values and when the absolute values of the coefficients used to determine the bending degree of the parabolic function exceed the certain threshold values, the parabola which is curve-fitted to all skeleton line and set of the moving paths is estimated as the curved lane, and wherein when the number of the skeleton line is more than the certain threshold values and when the absolute values of the coefficients used to determine the bending degree of the parabolic function are below the certain threshold values, the parabola that fits the skeleton line is determined as the curved lane.

2. The method of claim 1, wherein the curved lane candidates are detected by using a variable top-hat filter, in which a size of a filter window flexibly varies based on a lateral direction width of lane marking on a road from the forward images.

3. The method of claim 1, wherein the skeleton line is detected by coordinates of a median value selected after scanning in a lateral direction from the detected curved lane candidates.

4. The method of claim 1, wherein the parabolic function that is curved fitted using the skeleton line is estimated after coefficients of the parabolic function are calculated through a least square method using the coordinates of the skeleton line as input values.

5. The method of claim 1, wherein a radius and a center coordinates of the inscribed circle are calculated by using a radius of curvature at the representative points, which are tangent points of the parabola and the inscribed circle at the world coordinate value Y is 0, and a normal passing through the representative points, and the inscribed circle is generated after specifying the inscribed circle according to a bent direction of the curved lane.

6. The method of claim 1, wherein the anticipated coordinates of the representative points on the circumference are calculated through a rotation angle according to the circumference of the inscribed circle calculated by using moving distances travelled by vehicle speed, and the set of the moving paths on a current frame is generated after the set of the moving paths in previous frames is rotated, moved, and converted to coordinate axis on the current frame.

* * * * *